United States Patent
Barakat et al.

(10) Patent No.: US 11,801,503 B2
(45) Date of Patent: Oct. 31, 2023

(54) PROCESS OF MANUFACTURE OF A SOLID CATALYST MADE OF A SUPPORT COATED WITH A THIN CATALYTIC LAYER AND TO A PROCESS FOR ELIMINATING GASEOUS AND/OR PARTICULATE POLLUTANTS IN AN EXHAUST GAS

(71) Applicants: Universite de Namur, Namur (BE); STUV, Bois-de-Villers (BE)

(72) Inventors: Tarek Barakat, Namur (BE); Bao-Lian Su, Saint-Servais (BE)

(73) Assignee: STÛV, Bois-de-Villers (BE)

( * ) Notice: Subject to any disclaimer, the term of this patent is extended or adjusted under 35 U.S.C. 154(b) by 125 days.

(21) Appl. No.: 17/256,646

(22) PCT Filed: Jul. 3, 2019

(86) PCT No.: PCT/EP2019/067916
§ 371 (c)(1),
(2) Date: Dec. 28, 2020

(87) PCT Pub. No.: WO2020/007949
PCT Pub. Date: Jan. 9, 2020

(65) Prior Publication Data
US 2021/0260572 A1 Aug. 26, 2021

(30) Foreign Application Priority Data

Jul. 4, 2018 (EP) ..................... 18181577

(51) Int. Cl.
*B01J 37/03* (2006.01)
*B01D 53/86* (2006.01)
(Continued)

(52) U.S. Cl.
CPC .......... *B01J 37/038* (2013.01); *B01D 53/864* (2013.01); *B01D 53/8668* (2013.01);
(Continued)

(58) Field of Classification Search
CPC ........ B01J 37/038; B01J 37/04; B01J 37/082; B01J 21/066; B01J 21/12; B01J 21/14;
(Continued)

(56) References Cited

U.S. PATENT DOCUMENTS

| | | | |
|---|---|---|---|
| 7,144,840 B2 * | 12/2006 | Yeung | ...................... C23C 24/08 204/157.43 |
| 2009/0098032 A1 | 4/2009 | Yang et al. | |
| 2012/0115714 A1 * | 5/2012 | Arisawa | .............. C07D 491/113 502/223 |

FOREIGN PATENT DOCUMENTS

WO WO-2010151231 A1 * 12/2010 .............. B01J 21/06

OTHER PUBLICATIONS

Ng, Eng-Poh et al. "Metal chlorides supported on chiral mesoporous silica (MClx/CMS) as highly active Lewis acid catalyst for the selective hydroamination of cyclohexene," Jul. 2014. Journal of the Taiwan Institute of Chemical Engineers. vol. 45, Issue 4, pp. 14. (Year: 2014).*

(Continued)

*Primary Examiner* — Coris Fung
*Assistant Examiner* — Catriona M Corallo
(74) *Attorney, Agent, or Firm* — Christensen O'Connor Johnson Kindness PLLC

(57) ABSTRACT

A process of manufacture of a solid catalyst made of a support coated with a thin catalytic layer and a process for eliminating gaseous and/or particulate pollutants in an exhaust gas. The process of manufacture includes preparing a solution A by dissolving alkoxide and/or chloride precursors of at least one metal selected from Al, Si, Ti, Zr, Fe, Zn, Nb, V and Ce in a solvent S1, preparing a solution B containing a surfactant, an organic acid, and/or hydrochloric acid (HCl) in a solvent S2, mixing solution A and solution B together, thereby obtaining a washcoat solution C, and dip-coating, drying, and calcinating the support into wash-
(Continued)

coat solution C. The processes provide for elimination of volatile organic compounds (VOCs), CO, and/or particulate pollutants in an exhaust gas.

16 Claims, 1 Drawing Sheet

(51) Int. Cl.
| | |
|---|---|
| *B01J 21/06* | (2006.01) |
| *B01J 21/12* | (2006.01) |
| *B01J 21/14* | (2006.01) |
| *B01J 35/02* | (2006.01) |
| *B01J 35/10* | (2006.01) |
| *B01J 37/04* | (2006.01) |
| *B01J 37/08* | (2006.01) |

(52) U.S. Cl.
CPC ............ *B01J 21/066* (2013.01); *B01J 21/12* (2013.01); *B01J 21/14* (2013.01); *B01J 35/023* (2013.01); *B01J 35/1019* (2013.01); *B01J 35/1038* (2013.01); *B01J 35/1057* (2013.01); *B01J 35/1061* (2013.01); *B01J 37/04* (2013.01); *B01J 37/082* (2013.01); *B01D 2255/20707* (2013.01); *B01D 2255/20715* (2013.01); *B01D 2255/9202* (2013.01); *B01D 2257/502* (2013.01); *B01D 2257/708* (2013.01)

(58) Field of Classification Search
CPC .. B01J 35/023; B01J 35/1019; B01J 35/1038; B01J 35/1057; B01J 35/1061; B01D 53/864; B01D 53/8668; B01D 2255/20707; B01D 2255/20715; B01D 2255/9202; B01D 2257/502; B01D 2257/708
See application file for complete search history.

(56) References Cited

OTHER PUBLICATIONS

Li et al. "Effect of surfactants on the aggregation and stability of TiO2 nanomaterial in environmental aqueous matrices", 2017. Science of the Total Environment, p. 176-182. (Year: 2017).*
Chen et al. "Acid/Base-Treated Activated Carbons: Characterization of Functional Groups and Metal Adsorptive Properties", 2004. Langmuir, p. 2233-2242. (Year: 2004).*
Gnatyuk et al. "Design and Photocatalytic Activity of Mesoporous TiO2/ZrO2 Thin Films", 2005. Ukrainian National Academy of Sciences, p. 497- 508. (Year: 2005).*
Crisan et al. "Crystallization study of sol-gel un-doped and Pd-doped TiO2 materials", 2008. Journal of Physics and Chemistry of Solids, p. 2548-2554. (Year: 2008).*
Ranganayaki et al. "Preparation and Characterization of Nanocrystalline TiO2 Thin Films Prepared by Sol-Gel Spin Coating Method ", 2014. International Journal of Innovative Research in Science Engineering and Technology, p. 16707-16711. (Year: 2014).*
International Search Report dated Sep. 26, 2019, issued in corresponding International Application No. PCT/EP2019/067916, filed Jul. 3, 2019, 4 pages.
Written Opinion of the International Searching Authority dated Sep. 26, 2019, issued in corresponding International Application No. PCT/EP2019/067916, filed Jul. 3, 2019, 8 pages.
Boissiere, C., et al. "Porosity and Mechanical Properties of Mesoporous Thin Films Assessed by Environmental Ellipsometric Porosimetry," Langmuir: the ACS Journal of Surfaces and Colloids, 21(26):12362-12371, Nov. 30, 2005.
McCool, B.A., et al., "Synthesis and characterization of mesoporous silica membranes via dip-coating and hydrothermal deposition techniques," Journal of Membrane Science 218:55-67, Jul. 2003.
Scriven, L.E.; "Physics and Applications of Dip Coating and Spin Coating"; Mat. Res. Soc. Symp. Proc.; 1988; pp. 717-729 (13 pages total); vol. 121; Materials Research Society.

* cited by examiner

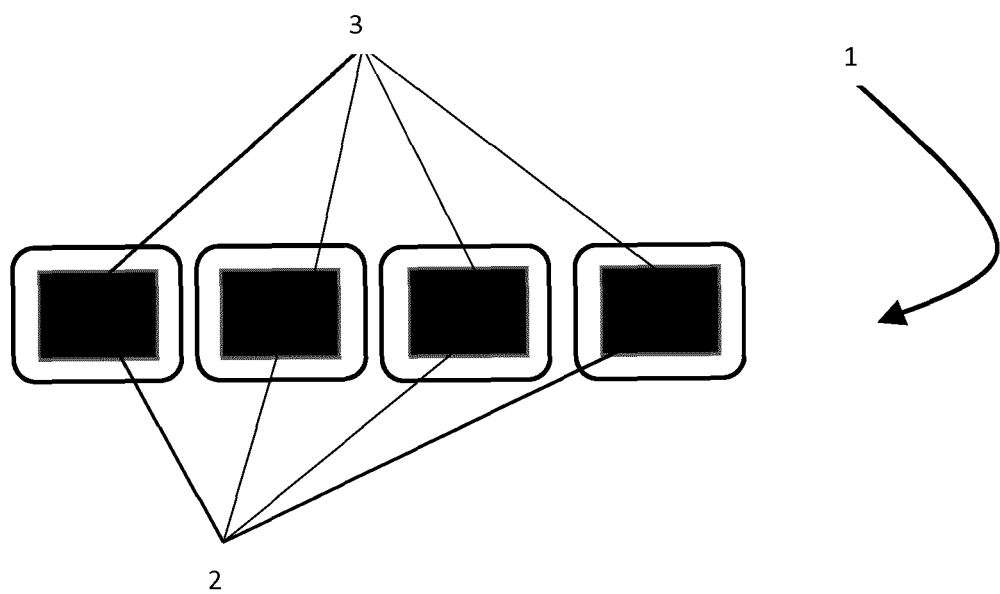

PROCESS OF MANUFACTURE OF A SOLID CATALYST MADE OF A SUPPORT COATED WITH A THIN CATALYTIC LAYER AND TO A PROCESS FOR ELIMINATING GASEOUS AND/OR PARTICULATE POLLUTANTS IN AN EXHAUST GAS

The invention relates to a process of manufacture of a solid catalyst made of a support coated with a thin catalytic layer and to a process for eliminating gaseous and/or particulate pollutants in an exhaust gas.

Volatile organic components (VOCs), CO and particulate matters can be highly toxic to human health and the environment. Their elimination is crucial.

They are present, in particular, in exhaust fumes generated by stoves or wood-burners or incinerators or cement plants or in vapors emitted when evaporating solvents in paint cabins. Current catalytic systems used for this aim involve either the integration of a coil heated by electrical means or the integration of a catalytic substrate onto which successive layers of different metal oxides are deposited.

The first technique induces a high-energy consumption value where the second technique focuses on a multilayer deposition in which an interlayer synergy allows the catalytic degradation of gaseous pollutants. The use of this second technique is generally followed by the impregnation of an active phase after the deposition of the catalytic layers. This renders it a costly procedure.

In addition to that, available systems on the market start functioning efficiently at high temperature (300-400° C.).

DE 102009002182 discloses a filter useful for removing particulate components.

The filter is a catalytic filter for removing particle from combustion exhaust gases.

The process of manufacture of this catalytic filter comprises the hydrolysis of metallic precursors in an alcoholic solvent. The viscosity of the solution increases and a gel is obtained which is subsequently dried in order to obtain a powder.

Then the obtained powder can be incorporated into an aqueous washcoat solution which may contain other ingredients such as ceramic surface enlarging materials, for example $Al_2O_3$. The coating of the filter substrate with the washcoat solution can be carried out, for example by dipping the substrate in the washcoat solution and subsequently drying, optionally followed by a high temperature process.

Thus, in this process, a gel is first formed and dried and the obtained powder is then incorporated into an aqueous wash-coat before recovering the filter substrate.

EP 2 420 316 discloses a method for preparing a porous oxide catalyst. In this process, the metallic precursors are nitrate salts of the metals which are mixed in ethanol in presence of HCl and a surfactant. The mixture is then dried at high temperature and then calcinated.

This document focuses on the synthesis of a catalyst and not to process for coating a substrate with a thin layer of catalyst.

Furthermore, should the man skilled in the art want to use a catalyst as disclosed in this documents for coating a substrate, then, he will have to redisperse the powder of catalyst in a solvent and he will have to carry out a drying and may be a calcination of the obtained coating. Such a process would involve the synthesis of the powder of a catalyst before the coating.

All these procedures are very complicated.

The invention aims to solve the drawbacks of the processes of the prior art for obtaining support coated with a layer of catalyst in a very simple manner.

For this aim, the invention proposes a process of manufacture of a solid catalyst (1) comprising a support (2) coated with a catalytic layer (3), the process comprising the following steps:

a) preparing a solution A by dissolving alkoxide and/or chloride precursors of at least one metal selected in the group consisting of Al, Si, Ti, Zr, Fe, Zn, Nb, V and Ce in a solvent S1 having a partition coefficient lower than 1 and containing less than 5% by volume of water with regards to the total volume of solvent S1, b) preparing a solution B containing an organic acid or hydrochloric acid (HCl) in a solvent S2 having a partition coefficient lower than 5, preferably less than 2, even more preferably less than 1; said solution A and/or said solution B further containing a surfactant, c) mixing solution A and solution B together, thereby obtaining a washcoat solution C, d) dip-coating the support (2) having OH groups at its surface into washcoat solution C, e) drying the coated support (2) obtained in step d), f) calcinating the dried, coated support (2) obtained in step e).

In a preferred embodiment, said solution B contains a surfactant, thus the process of the present invention is a process of manufacture of a solid catalyst comprising a support coated with a catalytic layer, the process comprising the following steps:

a) preparing a solution A by dissolving alkoxide and/or chloride precursors of at least one metal selected in the group consisting of Al, Si, Ti, Zr, Fe, Zn, Nb, V and Ce in a solvent S1 having a partition coefficient lower than 1 and containing less than 5% by volume of water, b) preparing a solution B containing an organic acid or hydrochloric acid (HCl) in a solvent S2 having a partition coefficient less than 1, said solution B further containing a surfactant, c) mixing solution A and solution B together, thereby obtaining a washcoat solution C, d) dip-coating the support having OH groups at its surface into solution C, e) drying the coated support obtained in step d), f) calcinating the dried, coated support obtained in step e).

The partition coefficient is defined as the phase separation between octanol and water for each organic compound and is measured as disclosed in Sangster et al, Octanol-Water Partition Coefficients of Simple Organic Compounds, J. Phys. Chem. Ref. Data, vol 18, No 3, 1989). This partition coefficient defines the affinity of this organic compound in hydrophobic or hydrophilic media.

Said solvent S1 contains less than 5% by volume of water, preferably less than 3% by volume of water, more preferably less than 1% by volume of water with regards to the total volume of solvent S1.

If desired, said solution A contains less than 5% by volume of water, preferably less than 3% by volume of water, more preferably less than 1% by volume of water with regards to the total volume of solution A.

Optionally, step a) further comprises dissolving a complexing agent having a partition coefficient lower than 5, preferably less than 2, even more preferably less than 1.

If desired, said complexing agent is a complexing agent having a partition coefficient lower than 5, preferably less than 2, even more preferably less than 1, selected from the group consisting of N,N' bidentate ligands, N,O bidentate ligands and O,O' bidentate ligands and derivatives thereof. In the context of the present invention, the nomenclature N,N'—, N,O—, and O,O'— refers to bidentate ligands having two coordinating heteroatoms.

In the case of N,N' bidentate ligands, the two coordinating heteroatoms are nitrogen atoms. Examples of such N,N' bidentate ligands include ethylenediamine, phenanthroline, bipyridine and derivatives thereof.

In the case of O,O' bidentate ligands, the two coordinating heteroatoms are oxygen atoms. Examples of such O,O' bidentate ligands include catechol, 2-hydroxyacetophenone, oxalate, acetyl acetone, and derivatives thereof In the case of N,O bidentate ligands, the two coordinating heteroatoms are one nitrogen atom and one oxygen atom.

Preferably, said at least one complexing agent is a O,O' bidentate ligand.

Thus, if desired, said complexing agent can be selected from the group consisting of ethylenediamine, phenanthroline, bipyridine, catechol, 2-hydroxyacetophenone, oxalate, and derivatives thereof.

Other examples of complexing agent which can be used in the invention are acetate, oxalate, lactate or oleate compounds, preferably acetate or oxalate compounds, even more preferably acetyl acetone. The complexing agent aims at stabilizing the metal and has a higher affinity for the metal than for the alkoxide precursors of the metal.

If desired, said complexing agent can be present in solution A at a molar ratio equal to or higher than 0.1 mol per 1 mol of metal(s), preferably equal to or higher than 0.2 mol per 1 mol of metal(s), more preferably equal to or higher than 0.3 mol per 1 mol of metal(s). It is further understood that the higher limit of the molar ratio of mol of said complexing agent present in solution A per 1 mol of metal(s) can be equal to or lower than 5 mol per 1 mol of metal(s), preferably equal to or lower than 2.5 mol per 1 mol of metal(s), more preferably equal to or lower than 1 mol per 1 mol of metal(s), even more preferably equal to or lower than 0.5 mol per 1 mol of metal(s).

In this case, said complexing agent is preferably present in solution A at a molar ratio of from 0.1 to 5 mol, preferably from 0.1 mol to 2.5 mol, more preferably from 0.1 mol to 1 mol, even more preferably from 0.2 mol to 1 mol, even more preferably from 0.2 mol to 0.5 mol, even more preferably of 0.3 mol per 1 mol of metal(s).

Still optionally, the process of the invention also comprises, before step a), a step a1) of creating OH groups at the surface of the support, preferably by immersing the support in a piranha solution.

If desired, the total concentration of metal(s) in washcoat solution C is equal to or higher than 0.1 M, preferably equal to or higher than 0.2 M, more preferably equal to or higher than 0.3 M, even more preferably equal to or higher than 0.4 M, even more preferably equal to or higher than 0.5 M, even more preferably equal to or higher than 0.6 M, even more preferably equal to or higher than 0.7 M, even more preferably equal to or higher than 0.8 M, even more preferably equal to or higher than 0.9 M. It is further understood that the higher limit of the total concentration of metal(s) in washcoat solution C can be preferably equal to or lower than 3M, preferably equal to or lower than 2.5 M, more preferably equal to or lower than 2M, more preferably equal to or lower than 1.5 M.

Preferably, the total concentration of metal(s) in washcoat solution C is comprised between 0.1 and 3 M inclusive, more preferably between 0.2 M and 3M, even more preferably between 0.4 M and 2.5 M, even more preferably between 0.6 M and 2 M, even more preferably between 0.8 M and 1.5 M, even more preferably between 0.9 M and 1.5 M, even more preferably is of 1 M.

If desired, said washcoat solution C contains at least 0.01% by volume of water, preferably at least 0.1% by volume of water, more preferably at least 1% by volume of water. It is further understood that the higher limit of the percentage of water by volume in washcoat solution C can be preferably lower than 15% by volume, more preferably lower than 10% by volume, even more preferably lower than 5% by volume, with regards to the total volume of said washcoat solution C.

If desired, said washcoat solution C contains between 0.01 and 15% by volume of water, preferably between 0.1 and 10% by volume of water, more preferably between 1 and 5% by volume of water with regards to the total volume of said washcoat solution C.

If desired, the solvent S1 and the solvent S2 may be independently from each other selected from the group constituted of C1-C4 alcohol solvents, C1-C6 amine solvents, C1-C6 amide solvents, C1-C6 ketone solvents, C1-C4 sulfoxide solvents, C1-C6 ether solvents, C1-C6 nitrile solvents and mixtures thereof.

Examples of C1-C4 alcohol solvents include methanol, ethanol, n-propanol, iso-propanol, n-butanol, sec-butanol, iso-butanol and ter-butanol, ethylene glycol, propylene glycol, tetramethylene glycol.

Examples of C1-C6 amine solvents include diethanolamine, morpholine, ethylenediamine, diethylenetriamine, pyrrolidine, triethylamine.

Examples of C1-C6 amide solvents include dimethylacetamide, dimethylformamide, formamide, n-methylformamide, n-methyl-2-pyrrolidone, n-formylmorpholine.

Examples of C1-C6 ketone solvents include acetone, butanone, cyclopentanone, 2-pentanone.

Examples of C1-C4 sulfoxide solvents include dimethylsulfoxide.

Examples of C1-C6 ether solvent include diethyl ether, tetrahydrofuran, 1,4-dioxane, 1,3-dioxane, dimethoxyethane, diethylene glycol dimethyl ether, 1,2-dimethoxyethane, diethylene glycol.

Examples of C1-C4 nitrile solvents include propionitrile and acetonitrile,

Thus, if desired, said solvent S1 and solvent S2 maybe be independently from each other selected from the group constituted methanol, ethanol, n-propanol, iso-propanol, n-butanol, sec-butanol, iso-butanol and ter-butanol, ethylene glycol, propylene glycol, tetramethylene glycol, diethanolamine, morpholine, ethylenediamine, diethylenetriamine, pyrrolidine, trimethylamine, dimethylacetamide, dimethylformamide, formamide, n-methylformamide, n-methyl-2-pyrrolidone, n-formylmorpholine, acetone, butanone, cyclopentanone, 2-pentanone, dimethylsulfoxide, diethyl ether, tetrahydrofuran, 1,4-dioxane, 1,3-dioxane, dimethoxyethane, diethylene glycol dimethyl ether, 1,2-dimethoxy-ethane, diethylene glycol, propionitrile and acetonitrile.

Even more preferably, the solvent S1 and the solvent S2 are independently from each other chosen among $C_1$-$C_4$ alcohol. More preferably the solvent S1 is same as the solvent S2. Even more preferably, said solvent S1 and said solvent S2 are independently from each other chosen from the group constituted of methanol, ethanol, n-propanol, iso-propanol, n-butanol, sec-butanol, iso-butanol, ter-butanol, ethylene glycol, propylene glycol, tetramethylene glycol and mixtures thereof. Even more preferably said solvent S1 and said solvent S2 is ethanol, n-propanol or iso-propanol.

In a preferred embodiment, solution A further comprises a Pd precursor, preferably Pd acetyl acetonate (Pd(acac)$_2$), more preferably Pd acetyl acetonate (Pd(acac)$_2$) at a weight fraction of from 0.1 to 30 wt %, preferably at a weight ratio of from 0.1 to 5 wt %, of the total weight of metal oxide(s) present in the layer (2) obtained after step f).

If desired, the organic acid in solution B is selected in the group consisting of formic acid, acetic acid, propanoic acid, butanoic acid and mixtures thereof.

Still preferably, the organic acid in solution B is selected in the group consisting of formic acid, acetic acid, propanoic acid, butanoic acid and mixtures thereof and is present in solution B at a molar ratio of organic acid of from 0.1 to 50, preferably of from 0.3 to 1, mol per 1 mol of metal(s) and HCl is present in solution B at a molar ratio of from 0.1 and 50 mol, preferably of from 1 and 4 mol of HCl per 1 mol of metal(s).

Preferably, the surfactant in solution B is chosen among:
cationic surfactants, preferably cetyltrimetylammonium bromide (CTAB) and quaternary ammoniums, preferably at a molar ratio of from 0.01 to 1 mol, more preferably of 0.13 mol, per 1 mol of metal(s,)
anionic surfactants, preferably sodium dodecyl sulfate (SDS), preferably at a molar ratio of from 0.01 to 1 mol, more preferably of 0.13 mol, per 1 mol of metal(s),
neutral surfactants based on ethylene oxide (EO), preferably at a concentration of from 0.01 to 20, preferably 1 mol of ethylene oxide per 1 mol of metal(s).

Again preferably, the alkoxide and/or chloride precursors of metal(s) are alkoxide and/or chloride precursors of Ti and Zr, more preferably are $C_1$-$C_4$ alkoxide, even more preferably ethoxide of Ti and Zr.

In this latter case, preferably the molar ratio of Ti is of from 60 to 99% and the molar ratio of Zr is of from 1 to 40% on the basis of the total number of moles of Ti+Zr.

Then and again preferably, step d) of dip-coating the support in solution C is carried out at a speed rate comprised between 0.1 to 1000 mm/min, preferably at a speed of from 6 to 120 mm/min, even more preferably between 20 and 100 mm/min at a relative humidity (RH) of from 20 to 80%, preferably of from 45 to 65%.

Indeed step d) must be carried out in an environment where humidity is controlled. This environment can be a room, a hood, a box . . . .

Step e) of drying the support coated with solution C obtained in step d) comprises at least one step of drying at a temperature comprised between 10 and 200° C. during between 0.1 and 24 hours.

Several steps of drying are preferably carried out, separated by intervals of 0.1 to 48 hours. Preferably, calcination step is carried out at a temperature comprised between 250 and 700° C., preferably between 500 and 550° C. with a dwell time of 0.5 to 12 hours and a 0.1 to 5° C./min ramp between ambient and the target temperature.

With the process of invention the thickness of the catalytic layer is preferably comprised between 50 nm to 1 mm, more preferably between 200 nm and 2.5 µm and the catalytic layer preferably has pores having average diameters measured by ellipsometry comprised between 1 and 50 nm, preferably between 2 and 30 nm, more preferably between 2 and 15 nm, even more preferably between 2 and 10 nm.

If desired, the catalytic layer preferably has pores having average diameters measured by nitrogen physisorption using a gas adsorption analyzer (Micromeritics 3Flex Surface Characterization) apparatus obtained after vacuum degassing at 150° C., and calculated using the BJH (Barrett, Joyner, Halenda) method, comprised between 1 and 50 nm, preferably between 2 and 30 nm, more preferably between 2 and 15 nm, even more preferably between 2 and 10 nm and more preferably centered at around 8 nm.

If desired, said support may be a ceramic support, preferably a ceramic support selected from the group consisting of silica substrates, magnesium-alumino-silicate ceramic substrates, alumino-silicate substrates, alumina substrates. Magnesium alumino-silicate ceramic substrates include for example cordierite substrates.

In a preferred embodiment, the support has mesopores preferably having average diameters measured by ellipsometry comprised between 2 and 50 nm.

The method for measuring diameters of pores by ellipsometry used in the invention is described in Boissiere et al, "Porosity and Mechanical Properties of Mesoporous Thin Films Assessed by Environmental Ellipsometric Porosimetry", *Langmuir* 2005, 21, 12362-12371, in the paragraph entitled Experimental Protocol of EEP Analysis on page 12364.

The invention also proposes a process for eliminating gaseous and/or particulate pollutants contained in an exhaust gas comprising a step of contacting said exhaust gas with a solid catalyst comprising a support coated with a catalytic layer, said solid catalyst being obtained by the process according to the invention.

The invention will be better understood and other advantages and features thereof will become apparent when reading the following description which is made in connection with the annexed FIGURE in which:

FIG. 1 schematically represents a solid catalyst according to the invention.

The invention proposes a process for manufacturing a solid catalyst with a high surface area which enables to eliminate pollutants at a low temperature starting from 180° C. and having a long lifetime of at least several years.

Preferably, the process for manufacturing a solid catalyst of present invention is a process for manufacturing a solid catalyst having a BET surface area of at least 50 m$^2$/g, more preferably at least 100 m$^2$/g, even more preferably at least 150 m$^2$/g. If desired, the solid catalyst manufactured by the process of present invention may have a BET surface area comprised between 50 m$^2$/g and 300 m$^2$/g, preferably between 100 m$^2$/g and 200 m$^2$/g, more preferably between 150 m$^2$/g and 200 m$^2$/g. The BET surface area is measured by nitrogen physisorption using a gas adsorption analyzer (Micromeritics 3Flex apparatus, obtained after vacuum degassing at 150° C., and calculated by BET (Brunauer, Emmet, Teller) method.

If desired, the solid catalyst obtained by the process according to present invention may present total pore volume of at least 0.10 cm3/g, preferably comprised between 0.10 cm3/g and 0.70 cm3/g, more preferably comprised between 0.10 and 0.5 cm3/g, even more preferably 0.10 cm3/g and 0.40 cm3/g, even more preferably between 0.15 cm3/g and 0.30 cm3/g. The total pore volume is measured by nitrogen physisorption using a gas adsorption analyzer (Micromeritics 3Flex Surface Characterization) apparatus, obtained after vacuum degassing at 150° C., and calculated using the BJH (Barrett, Joyner, Halenda) method.

The process of the invention enables to obtain a catalyst, in a one-step synthesis procedure, adaptable to any surface for any morphology or texture, with a tunable porosity which provides a high accessibility to all constituents of the catalytic layer.

Furthermore, extremely low amounts of a transition metal, which play the role of an active phase, preferably Co, Cu, Mn, Ni, V, Nb, Au, Pt, Pd, Ru, Fe and/or Ag, more preferably Pd, of about 0.5 wt % are necessary i.e. ½₀ of the amount which is currently used.

The obtained catalyst is particularly useful for treating gases in industrial chimneys, for the treatment of indoor air at evacuation levels, the treatment of organic solvent emissions, for example of paints, and the treatment of emissions generated by biomass combustion, domestic or urban waste incineration.

A particularly intended use of the catalyst obtained by the process of the invention is for eliminating gaseous and/or particulate pollutants contained in an exhaust gas generated by stoves or wood-burners.

In contrast to the process for coating a substrate with a catalytic layer where a powder of the catalytic metal oxide(s) is first formed and then used in a washcoat for being applied on the substrate, the process of the invention uses as washcoat a solution of the metallic precursor(s) of the catalyst metal oxide(s).

Thus, the process of manufacturing of a solid catalyst, noted 1 in FIG. 1, comprising a support, noted 2 in FIG. 1, coated with a catalytic layer, noted 3 in FIG. 1, comprises, as first main step, a step a) of preparing a solution A of the alkoxide and/or chloride precursor(s) of at least one metal selected in the group consisting of Al, Si, Ti, Zr, Fe, Zn, Nb, V and Ce, a solvent having a partition coefficient lower than 1 and containing less than 5% by volume of water. In solution A, the solvent is a solvent having a partition coefficient lower than 1.

Furthermore, the solvent must contain less than 0.5% by volume of water.

Indeed, water participates to the reaction of hydrolysis of the precursors of the metals which are wanted in the final catalytic layer to be obtained instead of behaving as a solvent.

In solution A, the solvent is noted S1.

Preferred solvents S1 are $C_1$-$C_4$ alcohols. More preferably, the solvent S1 is ethanol because it can be easily evaporated and has a low partition coefficient.

The metallic precursors are selected in the group consisting of alkoxide and/or chloride salt(s) of the metal(s) which is (are) to be in the catalytic layer (3) coating the support (2).

Nitrate precursors of the metal(s) are not appropriate in the process of the invention.

Indeed, nitrate ions, when dissolved in solvent S1, form instable intermediates and are in competition with the metals, in particular when the metal is Zr, in the reaction with the surfactant which is in solution. Solution B is disclosed below.

Transition metals such as Co, Cu, Mn, Ni, V, Nb, Au, Pt, Pd, Ru, Fe and/or Ag can be used as an active phase. More preferably, palladium is used as an active phase. The preferred precursor is palladium acetyl acetonate (Pd)acac)$_2$. The amount of palladium metal, when used, is comprised between 0.01 and 30 wt %, more preferably between 0.05 and 10 even more preferably between 0.1 and 5 wt % of the total amount of the obtained catalyst The preferred alkoxide precursors of the metals are methoxide, ethoxide, propoxide, isopropoxide, butoxide salts of the metal. As already stated, metal chlorides or a mixture of alkoxide and chloride salts of the metal are also appropriate.

The metals which can be used are selected from Al, Si, Ti, Zr, Fe, Zn, Nb, V and Ce, alone or in mixture of two or more of these metals.

Preferred metals are Ti and Zr.

In this case, preferably the molar ratio of Ti is from 60 to 99% and the molar ratio of Zr is from 1 to 40%.

The amount of palladium when used is comprised between 0.01 and 30 wt %, more preferably between 0.05 and 10 even more preferably between 0.1 and 5 wt %.

All the weight percentages (wt %) given in the invention are wt % of the total weight of the coating obtained by the process of the invention The second step of the process of the invention is the manufacture of a solution B containing a surfactant, an organic acid and/or hydrochloric acid (HCl) in a solvent S2 having a partition coefficient less than 1.

It will clearly appear to the man skilled in the art that although preparing solution B is stated above as being the second step of the process, this step may be carried out before step a) or at the same time as step a).

In solution B, the organic acid is used to produce water molecules and to insure the stability of the washcoat to be obtained. Acids commonly used are formic acid, acetic acid and propanoic acid.

The molar ratio of organic acid is of from 0.1 to 50 mol per 1 mol of metal(s). Preferably, the molar ratio of organic acid is comprised between 0.1 and 1 mol per 1 mol of metal(s).

The partition coefficient of the organic acid should be lower than 1.

HCl may be used instead of the organic acid or in mixture with the organic acid.

Indeed, HCl enables to better stabilize the washcoat.

Preferably, the molar ratio of HCl is comprised between 0.1 and 50 mol per 1 mol of metal(s). More preferably, the molar ratio of HCl is comprised between 1 and 4 mol per 1 mol of metal(s). The surfactant is used to create a porous structure inside the coating.

Any surfactant can be employed:
- cationic surfactants such as cetyl trimethyl ammonium bromide (CTAB) and other quaternary ammonium surfactants. In this case, preferably, the molar ratio of surfactant is comprised between 0.01 and 1 mol per 1 mol of metal(s). More preferably, it will be of 0.13 mol per 1 mol of metal(s),
- anionic surfactants such as sodium dodecyl sulfate (SDS). In, this case, preferably, the molar ratio of surfactant is comprised between 0.01 and 1 mol per 1 mol of metal. More preferably, it will be of 0.13 mol per 1 mol of metals,
- neutral surfactants such as "F127", "P123", "Brij56", "Brij58", "Brij72". In this case, their concentration should preferably be between 0.01 and 20 ethylene oxide (EO) per 1 mol of metal(s). More preferably, their concentration is of 1 EO mol per 1 mol of metal(s).

The average diameter of the pores which are obtained with such concentrations of surfactant is in the range of 1 to 50 nm. Preferably, the average diameter of the pores is comprised between 2 and 30 nm and centered at around 8 nm.

Macropores may also be obtained. In this case, the average diameter of the macropores should be in the range of 50 nm to 50 µm. Preferably, they will be between 200 à 1500 nm and centered around 600 nm. These diameters are measured by scanning electron microscopy.

Solution B also contains a solvent S2 which can be the same as solvent S1 or different thereof. But, preferably, solvent S2 is the same as solvent S1.

Preferably, solvent S2 is a $C_1$-$C_4$ alcohol.

The amount of solvents S1 and S2 must be in excess of the amount necessary for obtaining dissolution of the compounds introduced in these solvents. Preferably, this excess is such that the evaporation of the solvents is not too long.

The following step of the process of the invention is a step c) of mixing solution A and solution B together thereby obtaining a solution C which is the washcoat.

The total concentration of metal(s) of solution C (washcoat) is preferably comprised between 0.1 and 3M. More preferably between 0.3 and 1.5M, ideally it is of 1 M.

Then, a step d) of dip-coating the support (2) in the wash-coated solution C is carried out.

The support (2) may be any kind of support i.e. metallic or ceramic support (silica, alumina, aluminosilicate).

The support (2) has pores having sizes enabling to avoid any over pressure or loss of pressure in the device emitting the exhaust gas to be treated for eliminating VOC's, CO and particulate matters The support (2) must have OH groups at a surface.

In order to create such OH groups at a surface of a substrate, a well-known procedure is to dip the support (2) in a piranha solution. A piranha solution comprises 1 volume $H_2O_2$ and 6 volumes ($H_2SO_4$).

The piranha solution may be replaced by a concentrated HCl solution (13M).

Preferably, for treating gas, the support (2) is porous. The porous structure may be a honeycomb, foam, lamellar or other porous forms.

Preferably, the dip-coating procedure is carried out at a speed comprised between 1 to 1000 mm/min. Preferably, the dip-coating procedure is carried out at a speed in the range of 20 to 120 mm/min.

The relative humidity during the dip-coating procedure should be maintained between 30 and 80%, preferably between 45 and 65%.

Thus, this dip-coating procedure also called "washcoating" consists in immersing the substrate at the specific speed stated above.

After the dip-coating procedure, the prepared sample is aged at temperature from 10 to 200° C. preferably at room temperature for a duration of from 0.1 to 72 hours preferably for 12 to 48 h more preferably from 18 to 24 hours at relative humidity that should be maintained between 30 and 80%, preferably between 45 and 65%. Then, in a step e) the solvents (S1, S2) of solution C are evaporated by drying. Preferably, the drying temperature is comprised between 10 and 200° C. Several drying steps may be carried out. Each drying step can take between 0.1 and 24 hours. The drying steps can be separated from each other by drying time intervals of 0.1 to 48 hours.

In following step f) of the process of the invention, the substrate coated with dried solution C is calcinated.

Preferably, the calcination is carried out at a temperature comprised between 250 and 700° C., preferably between 500 and 550° C. with a dwell time of 0.5 to 12 hours and a 0.1 to 5° C./min ramp between ambient and the target temperature.

The solid catalyst (1) obtained consists of the support (2) coated with a catalytic layer (3) consisting of metal oxide(s).

Palladium when used is under the form of PdO in layer (3) and the weight ratio of Pd in the thin catalytic layer is preferably comprised between 0.1 and 30 wt % of the resulting catalytic layer. Preferably, it is comprised between 0.1 and 5 wt %.

The layer (3) preferably has a thickness in the range of 50 nm to 1 mm, preferably between 200 nm and 2.5 µm.

For use in the treatment of an exhaust gas, preferably, the support (2) is porous in order to improve the contacting surface of the gas to be treated with the catalytic layer (3).

A complexing agent may also be introduced in solution A in step a) of the process of the invention. Such a complexing agent is used to stabilize the metal precursor(s) in solution A when highly humid surrounding conditions are employed.

This complexing agent must have a partition coefficient lower than 1. A preferable complexing agent is acetyl acetone (2,4-pentadione). When used, the molar ratio of the complexing agent is preferably comprised between 0.01 and 5 mol per 1 mol of metal(s.) More preferably, it is of 0.3 mol per 1 mol of metal(s).

The invention also proposes a process for eliminating gaseous and/or particulate pollutants contained in an exhaust gas, in particular of a stove or a wood-burner, comprising a step of contacting said exhaust gas with a solid catalyst (1) comprising a support (2) coated with a catalytic layer (3) obtained by the process of manufacture of a solid catalyst according to the invention.

In order to have a better understanding of the invention, an example of a mode of carrying out the process of manufacture of a solid catalyst with the process of the invention is described below.

EXAMPLE 1 a) Preparation of Solution A 60 gTi (iOPr)$_4$ and 22 g Zr(OPr)$_4$ precursors are added to 100 g propanol (anhydrous propanol, containing less than 1% by volume of water).

The molar ratio Ti:Zr is of 4:1.

The resulting mixture is stirred for about 30 mins.

Then, 11 g of acetyl acetone are added to the mixture and the resulting solution A is left under stiffing for about 30 mins to insure stabilization.

b) Preparation of Solution B

In a separate container, 600 g of propanol are mixed with 60 g of surfactant "Brij58" and 25 g of acetic acid.

c) Preparation of Solution C (Washcoat)

Solution A is added to solution B and the mixture is left to mature for 48 hours under stiffing.

The obtained solution is clear and homogeneous and can last up to 8 months when sealed and stored in a dry place.

a1)—Treatment of the Support (2)

A support (2) made of $Al_6Si_2O_{13}$ is sonicated in ethanol for 15 mins and then in water for 15 mins.

Then, it dipped in an acid solution comprising 1 volume $H_2O_2$ and 6 volumes $H_2SO_4$ for 15 mins and then rinsed abundantly.

Support (2) is then dried for 24 hours at 100° C.

After this treatment, OH groups are created at the surface of the support (2).

d) Dip-Coating

The dip-coating is carried out by immersing the support (2), obtained in step a1), in solution C at a speed rate of 90 mm/min at a relative humidity (RH) value of 50%. It is left to mature at ambient temperature under the same RH for at least 24 hours.

e) Drying Step

The coated support obtained in step e) is dried at 60° C. for 12 hours then at 100° C. for 12 hours.

f) Calcination Step

The dried coated support obtained in step e) is then calcinated under static air at 500-550° C. for 4 hours. The heating rate is of 1° C./min.

A solid catalyst (1) is obtained consisting of support (2) made of $Al_6Si_2O_{13}$ coated with a catalytic layer (3) comprising $ZrO_2$ and $TiO_2$ having a uniform thickness of 500 µm and pores having average diameters of 4.6 nm Catalyst (1) was used for treating an exhaust gas of a wood-burner. The textural properties of the obtained catalyst were measured and are shown in table 1. CO and VOC oxidation yields were also measured and are shown in table 2.

EXAMPLE 2 (STABILITY OF WASHCOAT SOLUTION C)

The same protocol as the one described in Example 1 was used but no acetylacetone was added. The obtained washcoat solution C is clear but after 48 hours of stirring the solution becomes hazy. After 72 hours, a pale yellow precipitate can be seen in the bottom of the sealed container. This example clearly illustrates that the addition of a complexing agent such as for example acetylacetone increases the stability of the washcoat solution C.

EXAMPLE 3

Preparation of Solution A 60 g $Ti(iOPr)_4$ and 22 g $Zr(OPr)_4$ precursors are added to 100 g propanol (anhydrous propanol, containing less than 1% by volume of water).

The molar ratio Ti:Zr is of 4:1.

The resulting mixture is stirred for about 30 min.

Then, 10.2 g of acetylacetone are added to the mixture and the resulting solution is left under stirring for about 30 min to insure stabilization.

Then, 1.3 g of palladium acetylacetonate were then added to the solution and the mixture was kept under stirring for another hour.

Preparation of Solution B

In a separate container, a solution of 600 g of propanol is mixed with 60 g of surfactant "Brij58" and 25 g of glacial acetic acid.

Preparation of Solution C (Washcoat)

Solution A is added to solution B, the obtained solution C was left under stirring for 48 h. The obtained solution is clear and homogeneous and can last up to 8 months when sealed and stored in a dry place.

The resulting sample is a mixed Pd-loaded Ti—Zr oxide catalyst with a Ti/Zr atomic ration of 4 and a weight ratio of 0.5% palladium per 1 g of catalyst. The Pd catalyst presents an excellent dispersion at the surface of the catalyst.

A cordierite substrate treated exactly in the same way as in step "a1) Treatment of the support (2)" of example 1, is then dip-coated in the above-prepared washcoat as to prepare catalytic thin film coated cordierites using the same conditions as in example 1. Then a drying step and a calcination step are performed in exactly the same conditions as in example 1.

The textural properties of the obtained catalyst were measured and are shown in table 1. The coated catalyst was then tested in the total elimination of gaseous pollutants (see table 2). CO and VOC oxidation yields were also measured and a shown in table 2.

EXAMPLE 4

Preparation of Solution A 81 g $Ti(iOPr)_4$ and 5 g $Nb(OEt)_4$ precursors are added to 100 g propanol (anhydrous propanol, containing less than 1% by volume of water).

The molar ratio Ti:Nb is of 19:1.

The resulting mixture is stirred for about 30 min.

Then, 8.9 g of acetylacetone are added to the mixture and the resulting solution is left under stirring for about 30 min to ensure stabilization.

Preparation of Solution B

In a separate container, a solution of 600 g of propanol is mixed with 56 g of surfactant Brij58 and 18 g of glacial acetic acid.

Preparation of Solution C (washcoat)

Solution A is added to solution B, the obtained solution C was left under stirring for 48 h. The obtained solution is clear and homogeneous and can last up to 8 months when sealed and stored in a dry place.

A cordierite substrate treated exactly in the same way as in step "a1) Treatment of the support (2)" of example 1, is then dip-coated in the above-prepared washcoat as to prepare catalytic thin film coated cordierites using the same conditions as in example 1. Then a drying step and a calcination step are performed in exactly the same conditions as in example 1.

The resulting sample was a highly porous niobium-doped titanium oxide sample. The textural properties of the obtained catalyst were measured and are shown in table 1.

EXAMPLE 5

Preparation of Solution A 60 g $Ti(iOPr)_4$ and 22 g $Zr(OPr)_4$ precursors were mixed in 100 g of water under stirring for 30 minute.

Then, 1.3 g of palladium acetylacetonate were then added to the solution and the mixture was kept under stirring for another hour.

Preparation of Solution B

In another beaker, 56 g of surfactant "Brij58" were dispersed in 1 litre of water with and 25 g of glacial acetic acid.

Preparation of Solution C (Washcoat)

Solution B was added to solution A at a rate of 2 drops per second. A precipitate instantly forms. The resulting opaque grainy solution is left under stirring for 48 hours before use.

A cordierite substrate treated exactly in the same way as in step "a1) Treatment of the support (2)" of example 1, is then dip-coated in the above-prepared washcoat as to prepare catalytic thin film coated cordierites using the same conditions as in example 1. Then a drying step and a calcination step are performed in exactly the same conditions as in example 1.

The coated catalyst was then tested in the total elimination of gaseous pollutants. It was observed that the obtained coating was not a film but was made of particles.

The catalytic properties of the obtained catalyst were measured and are shown in table 2. As can be seen the obtained catalyst has poor VOC conversion. As a consequence, the catalyst is not at all suitable for the conversion of VOC.

TABLE 1

Textural properties of the materials synthesised in example 1 to 5

| Samples | BET surface area ($m^2/g$) | Total pore volume ($cm^3/g$) | Average pore diameter (nm) |
|---|---|---|---|
| Example 1 | 165 | 0.20 | 4.6 |
| Example 3 | 172 | 0.27 | 5.7 |
| Example 4 | 120 | 0.27 | 7.4 |

The BET surface area was measured by nitrogen physisorption using a gas adsorption analyzer (Micromeritics 3Flex Surface Characterization) apparatus, obtained after vacuum degassing at 150° C. and calculated by BET (Brunauer, Emmet, Teller) method.

The total pore volumes are measured by nitrogen physisorption using a gas adsorption analyzer (Micromeritics 3Flex Surface Characterization) apparatus, obtained after vacuum degassing at 150° C., and calculated using the BJH (Barrett, Joyner, Halenda) method. The average pore diameters are measured by nitrogen physisorption using a gas adsorption analyzer £Micromeritics 3Flex Surface Characterization) apparatus, obtained after vacuum degassing at 150° C., and calculated using the BJH (Barrett, Joyner, Halenda) method.

TABLE 2

CO and VOC oxidation yields over samples prepared in examples 1, 3 and 6. In each example, the coating represented 2.5% wt of the final coated monolith.

| Samples | VOC conversion yield (%) [1] | | | CO conversion yield (%) [2] | | |
|---|---|---|---|---|---|---|
| | 200° C. | 300° C. | 400° C. | 200° C. | 300° C. | 400° C. |
| Example 1 (film coated-cordierite) | 0 | 6 | 8 | 0 | 6 | 6.5 |
| Example 3 (film coated-cordierite) | 5 | 20 | 30 | 2 | 31 | 33 |
| Example 5 (powder coated-cordierite) | 0 | 0 | 0 | 0 | 34 | 57 |

[1] VOC conversion yields are calculated using the following equation: (VOC initial concentration-VOC concentration at specific temperature )/(VOC initial concentration)
[2] CO conversion yields are calculated using the following equation: (CO initial concentration-CO concentration at specific temperature )/(CO initial concentration)

Experiments were conducted in an upflow stainless steel reactor under a flow of gaseous pollutants diluted in purified air. The gaseous mixture was passed through the catalyst-coated cordierite at a flow rate of 2.2 L/min and was analysed using a Thermo Scientific™ Interscience Trace™ 1300 series gas chromatograph equipped with a FID and a TCD.

The invention claimed is:

1. A process of manufacture of a solid catalyst comprising a support coated with a catalytic layer, the process comprising:
   a) creating hydroxyl (OH) groups at a surface of the support;
   b) preparing a solution A by dissolving alkoxide and/or chloride precursors of at least one metal selected from the group consisting of: Ti, Zr, Fe, Zn, Nb, V and Ce in a solvent S1 having a partition coefficient lower than 1 and containing less than 5% by volume of water with regard to the total volume of said solvent S1;
   c) preparing a solution B comprising an organic acid and/or hydrochloric acid (HCl) in a solvent S2 having a partition coefficient lower than 5, said solution A and/or said solution B further comprising a surfactant;
   d) mixing solution A and solution B together, thereby obtaining a washcoat solution C;
   e) dip-coating the surface of the support into washcoat solution C, providing a coated support;
   f) drying the coated support obtained in step e), providing a dried, coated support; and
   g) calcinating the dried, coated support obtained in step f).

2. The process according to claim 1, wherein step b) further comprises dissolving in solution A a complexing agent of the at least one metal having a partition coefficient lower than 5, said complexing agent being present in solution A at a molar ratio of from 0.1 to 5 mol per 1 mol of the at least one metal.

3. The process according to claim 1, wherein the total concentration of the at least one metal in the washcoat solution C is between 0.1 and 3 M.

4. The process according to claim 1, wherein the solvent S1 and the solvent S2 are chosen, independently from each other, among $C_1$-$C_4$ alcohols.

5. The process according to claim 1, wherein solution A further comprises a transition metal precursor such as Co, Cu, Mn, Ni, V, Nb, Au, Pt, Pd, Ru, Fe, Ag or a mixture thereof, at a weight fraction of from 0.1 to 30 wt % of the total weight of metal oxide present in the catalytic layer obtained after step g).

6. The process according to claim 1, wherein the organic acid in solution B is selected from the group consisting of: formic acid, acetic acid, propanoic acid, butanoic acid, and mixtures thereof, and is present in solution B at a molar ratio of organic acid of from 0.1 to 50 mol per 1 mol of the at least one metal, and HCl is present in solution B at a molar ratio of from 0.1 and 50 mol of HCl per 1 mol of the at least one metal.

7. The process according to claim 1, wherein the surfactant in solution B is selected from the group consisting of:
   cationic surfactants at a molar ratio of from 0.01 to 1 mol per 1 mol of the at least one metal;
   anionic surfactants at a molar ratio of from 0.01 to 1 mol per 1 mol of the at least one metal; and
   neutral surfactants based on ethylene oxide (EO) at a concentration of from 0.01 to 20 mol per 1 mol of the at least one metal.

8. The process according to claim 1, wherein the alkoxide and/or chloride precursors of the at least one metal comprise alkoxide and/or chloride precursors of Ti and Zr.

9. The process according to claim 8, wherein the molar ratio of Ti is from 60 to 99% and the molar ratio of Zr is from 1 to 40% on the basis of the total number of mol of Ti+Zr.

10. The process according to claim 1, wherein step of dip-coating the support in solution C is carried out at a speed rate comprised between 0.1 to 1000 mm/min at a relative humidity (RH) of from 30 to 80%.

11. The process according to claim 1, wherein step f) of drying the support coated with solution C obtained in step e) comprises at least one step of drying at a temperature comprised between 10 and 200° C. during between 0.1 and 24 hours.

12. The process according to claim 11, wherein several steps f) of drying are carried out, separated by intervals of 0.1 to 48 hours.

13. The process according to claim 1, wherein step g) is carried out at a temperature comprised between 250 and 700° C. with a dwell time of 0.5 to 12 hours and a 0.1 to 5° C./min ramp between an ambient and a target temperature.

14. The process according to claim 1, wherein the thickness of the catalytic layer is between 50 nm and 1 mm.

15. The process according to claim 1, wherein the catalytic layer has pores having average diameters of between 1 and 50 nm.

16. A process for eliminating gaseous and/or particulate pollutants contained in an exhaust gas comprising a step of contacting said exhaust gas with a solid catalyst obtained by the process of manufacture according to claim 1.

* * * * *

UNITED STATES PATENT AND TRADEMARK OFFICE
CERTIFICATE OF CORRECTION

PATENT NO. : 11,801,503 B2
APPLICATION NO. : 17/256646
DATED : October 31, 2023
INVENTOR(S) : T. Barakat et al.

It is certified that error appears in the above-identified patent and that said Letters Patent is hereby corrected as shown below:

In the Claims

| Column | Line | |
|---|---|---|
| 14 | 40 | Claim 10, change "step of" to -- step e) of -- |
| 14 | 45-46 | Claim 11, change "step comprises" to -- step e) comprises -- |

Signed and Sealed this
Twenty-eighth Day of May, 2024

Katherine Kelly Vidal
*Director of the United States Patent and Trademark Office*